Aug. 21, 1956 LE ROY C. SPENARD 2,760,018

CIRCUIT MAKERS AND BREAKERS

Filed May 25, 1953 5 Sheets-Sheet 1

INVENTOR.
LEROY C. SPENARD
BY David D. McKenney
ATTORNEY

CIRCUIT MAKERS AND BREAKERS

Filed May 25, 1953 5 Sheets-Sheet 2

INVENTOR.
LEROY C. SPENARD
BY David D. McKenney
ATTORNEY

Aug. 21, 1956 LE ROY C. SPENARD 2,760,018

CIRCUIT MAKERS AND BREAKERS

Filed May 25, 1953 5 Sheets-Sheet 3

INVENTOR.
LEROY C. SPENARD
BY David D. McKenney
ATTORNEY

INVENTOR.
LEROY C. SPENARD
BY David D. McKenney
ATTORNEY

INVENTOR.
LEROY C. SPENARD
BY David D. McKenney
ATTORNEY 2,760,018
Patented Aug. 21, 1956

2,760,018

CIRCUIT MAKERS AND BREAKERS

Le Roy C. Spenard, Port Washington, N. Y., assignor to Holmes Electric Protective Company, New York, N. Y., a corporation of New York Application May 25, 1953, Serial No. 357,016
4 Claims. (Cl. 200—19)

This invention relates to improvements in circuit makers and breakers. More particularly it has to do with an improved code wheel and contact assembly which makes and breaks a circuit to produce a code signal, thereby indicating to a central office on which premises the protection equipment has been disturbed.

In alarm systems, as for example in electrical burglar alarm or fire alarm systems, it frequently happens that the subscriber's premises are a considerable distance from the central office, and the economical use of cable conductors makes it attractive to connect a number of subscribers in series on one loop from the central office rather than have a direct cable connection to each subscriber. In actual practice, however, such a simple arrangement would be subject to service breakdowns. For example, a simple break would put out of service all the subscribers on the loop. Consequently, it is required that these loops be able to transmit alarms from all subscribers even when the loop becomes open or grounded.

These requirements are easily met by using a well-known loop called the McCollough circuit. In this circuit when the loop becomes open or grounded, certain switches in the central office are thrown so that code signals from subscribers on either side of the loop defect can come back to the central office via ground. To do this, code wheel and contact assemblies have in the past been so devised that they operate first by opening the circuit and then grounding it in succession as the teeth on the code wheel revolve. Thus, assume the loop defect is a break which has not been repaired and a subscriber's premises are disturbed by a burglar, in the case of a burglar alarm system, or by a fire, in the case of a fire alarm system. The subscriber's local circuit is upset by such disturbance and his code wheel, located on the premises, begins to revolve. Because of the unrepaired break no current was flowing in the loop at the time of the disturbance, but when the code wheel rotates, each tooth thereon engages a lever switch and momentarily completes the circuit to the central office through ground. A pen-magnet or other equipment in the central office is responsive to these momentary completions of the circuit, and since each code wheel in the loop has a different number of teeth, the disturbed premises can be identified in the central office by the number of circuit completions.

Now assume the loop defect is a ground which has not been repaired and a subscriber's premises are disturbed as before. Again the subscriber's local circuit is upset by the disturbance and his code wheel begins to revolve. In this case, however, current was flowing in the loop at the time of the disturbance because the circuit was completed to the central office via the ground defect, but as the code wheel rotates, each tooth thereon engages a lever switch and opens the circuit. The equipment in the central office which was responsive to momentary completion of the circuit in the case of a break defect is now responsive to momentary interruptions in the normal current flow, and as before the number of signals identifies the premises.

It will be understood from the foregoing and more clearly from the discussion hereinafter that rotation of the code wheel must be capable of achieving a series of short alternating interruptions and completions of the McCollough circuit with this circuit being grounded during each short completion period.

I have discovered that when a pair of lever contact switches located in the circuit are disposed with respect to the code wheel so that the teeth thereon can enter between and separate the switches the short circuit interruption periods can be accomplished by having portions of these teeth formed of insulating material, and the short circuit completion periods can be accomplished by having the remaining tooth portions formed of a conducting material. As a result, grounding of the circuit during the circuit completion periods can be achieved by connecting the conducting tooth portions to the grounded code wheel shaft. One advantage of such an arrangement is that fine adjustment of the lever contact switches with respect to the code wheel teeth is not necessary. The duration of the short circuit interruption and completion periods is determined solely by the accurate width of the insulating and conducting portions of the teeth.

Accordingly, it is an object of the present invention to provide a circuit maker and breaker in which a pair of normally connected lever contact switches are alternately disconnected and reconnected by the entrance therebetween of teeth on a rotatable code wheel and in which a connection is accomplished between both switches and the code wheel shaft when the switches are reconnected by the teeth.

Another object of the invention is to provide a circuit maker and breaker of the kind described in which the durations of the periods during which the switches are disconnected and reconnected are not dependent upon fine adjustments of the positions of the switches with respect to each other and the code wheel.

Still another object is to provide a device of the kind described in which the code wheel teeth are scored at their roots so that they can be selectively broken off in the field to achieve a new code for the premises without other changes.

The best mode in which I have contemplated applying the principles of my invention is described in the following text and shown in the accompanying drawings, but the latter are to be deemed merely illustrative for it is intended that the patent shall cover by suitable expression in the appended claims whatever features of patentable novelty reside in the invention disclosed:

Figure 1:
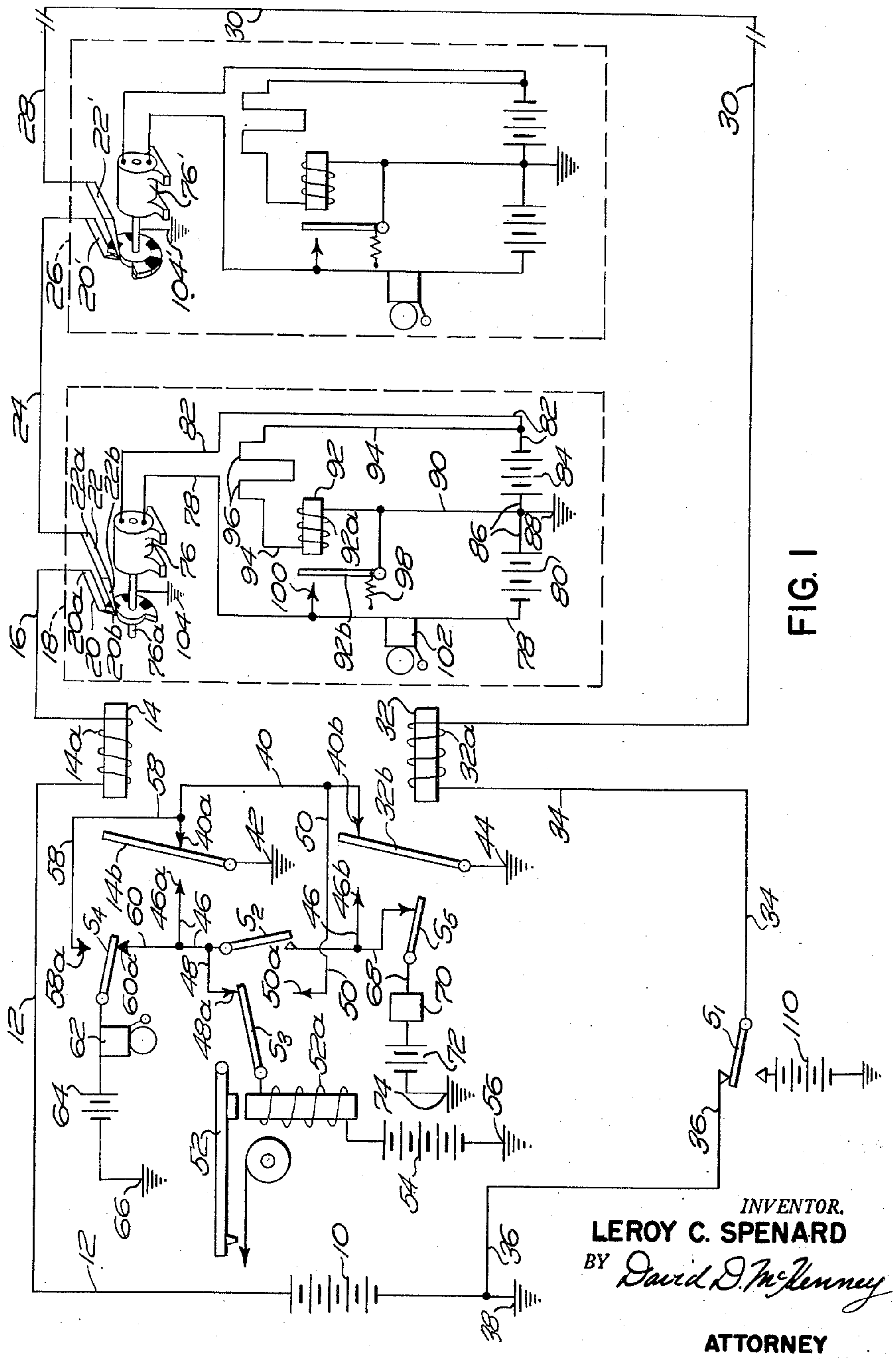
Figure 1 is a diagram of a burglar alarm circuit in which my improved code wheel and contact assembly may be used, the circuit being shown in its normal operating condition. It will be understood, however, that my code wheel may be employed in systems designed to detect other disturbances, as, for example, fires.

Referring now more particularly to the drawings, Fig. 1 show a burglar alarm system in which my improved code wheel and contact assemblies may be employed. In general the circuit, usually known as a "McCollough loop," comprises a central office battery 10 or other source of direct current from one side of which a conductor 12 leads to the windings 14*a* of a relay 14 also located in the central office. From this relay another conductor 16 leads to the premises 18 of the first subscriber on the loop where it is connected to one end 20*a* of a spring contact lever 20 of my improved code wheel and contact assembly. The other end 20*b* of this spring contact lever 20 normally touches the corresponding end 22*b* of a second contact lever 22, and another conductor 24 connected to the end 22*a* of this second contact lever leads to the premises 26 of the second subscriber on the loop. At these premises 26 conductor 24 is connected to a spring contact lever 20' of another code wheel and contact assembly which is identical to the assembly at premises 18 except for the number of teeth on the code wheel itself. Contact lever 20' also normally touches its companion contact lever 22', and another conductor 28 leads therefrom to the premises of the next subscriber on the loop. And so on for as many subscribers as the central office battery 10 is able to carry.

From the premises of the last subscriber on the loop a conductor 30 leads back to the windings 32*a* of a second relay 32 in the central office, and from these windings a conductor 34 leads to a switch $S_1$. When the circuit is in normal operating condition this switch connects conductor 34 to another conductor 36 which leads to ground point 38 and to the other side of central office battery 10.

It is clear from the description thus far that when the contact levers in each code wheel and contact lever assembly are touching each other and switch $S_1$ is in the position shown in Fig. 1 there is a completed metallic circuit leading from one side of central office battery 10 and returning to the other side. The current flowing in this completed circuit energizes relays 14 and 32 causing their armatures 14*b* and 32*b* to be held against contact points 40*a* and 40*b*, respectively, at the ends of a conductor 40. These armatures 14*b* and 32*b* are grounded at points 42 and 44, respectively. If for any reason no current is flowing in the windings of the relays the armatures 14*b* and 32*b* move over against contact points 46*a* and 46*b*, respectively, at the ends of a conductor 46. A switch $S_2$ is located in this conductor 46 between its ends 46*a* and 46*b*. Another conductor 48 is connected to conductor 46 between contact point 46*a* and switch $S_2$ and terminates in contact point 48*a*. A third switch $S_3$ may bear against this contact point or against a contact point 50*a* at the end of a conductor 50 depending on which way the switch $S_3$ is thrown. Conductor 50 leads to conductor 40, and switch $S_3$ is connected to the electro-magnetic windings 52*a* of a pen-magnet 52. These windings are in turn connected to one side of a battery 54 which has its other side grounded at a ground point 56.

Leading from conductor 40 is another conductor 58 which terminates in a contact point 58*a*. A switch $S_4$ may bear against this contact point or against a contact point 60*a* on the end of a conductor 60 which is connected to conductor 46 between its end 46*a* and switch $S_2$. Switch $S_4$ is connected to a single stroke bell 62 which is in turn connected to one side of a battery 64 the other side of which is grounded at ground point 66.

Between contact point 46*b* and switch $S_2$ there is connected to conductor 46 one end of a conductor 68 whose other end terminates at a buzzer 70. A switch $S_5$ is located in the conductor 68. The buzzer 70 is connected to one side of a battery 72 the other side of which is grounded at ground point 74.

When the premises of the subscribers on the loop are undisturbed the local protection circuits are arranged so that no current is supplied to a code wheel electric motor 76. More particularly each local protection circuit comprises a conductor 78 leading from one terminal of the motor 76 to one side of a battery 80, and another conductor 82 leading from the other motor terminal to the corresponding side of a second battery 84. The remaining sides of the two batteries are connected together by a conductor 86 which is grounded at ground point 88 and from which a conductor 90 leads to the windings 92*a* of a relay 92. From these relay windings a conductor 94 leads back to conductor 82, and on conductor 94 are located those devices 96, such as metal tape for windows, which are disturbed by an intrusion and alter or prevent the flow of current in conductor 94. A somewhat different local protection circuit would, of course, be provided where some other disturbance is desired to be detected, as, for example, a fire.

The armature 92*b* of relay 92 has one of its ends connected to conductor 90, and a spring 98 urges the other end of the armature against a contact point 100 connected to conductor 78 when the relay is deenergized. A bell 102 is located on conductor 78 between contact point 100 and battery 80.

When this local protection circuit is undisturbed battery 84 therein drives current through the circuit comprising conductor 86, conductor 90, relay windings 92*a*, conductor 94, device 96 and conductor 82, and the energized relay 92 holds its armature 92*b* away from contact point 100. No current is supplied to motor 76 because batteries 80 and 84 oppose each other. However, when an intruder deenergizes relay 92 by opening its circuit at device 96, spring 98 pulls armature 92*b* against contact point 100 whereupon battery 84 drives current through the circuit comprising conductor 86, conductor 90, armature 92*b*, contact point 100, conductor 78, motor 76 and conductor 82, starting the motor 76, and battery 80 drives current through a circuit comprising conductor 86, conductor 90, armature 92*b*, contact point 100, conductor 78, and bell 102.

The shaft 76*a* of the motor 76 is grounded at ground point 104 and has the code wheel of my improved code wheel and contact assembly secured to it. When the motor is started the teeth on the periphery of the code wheel slide between the ends of the contact levers 20 and 22 and spread them apart. Half the peripheral teeth are made of insulation material and alternating with these are the remaining teeth which are metallic and permit current in the contact levers touching them to flow to ground at ground point 104.

When the system is in its normal operating condition the central office relays 14 and 32 are energized holding their respective armatures 14*b* and 32*b* against contact points 40*a* and 40*b*. Assuming there is an intrusion on premises 18 of the first subscriber the code wheel begins to revolve and its first metallic tooth slides between the ends 20*b* and 22*b* of contact levers 20 and 22. This promptly grounds the loop at ground point 104, by-passing all of the loops between this ground point and ground point 38. Consequently relay 32 is deenergized and armature 32*b* falls over against contact point 46*b* sounding the buzzer 70 which now has a completed circuit comprising ground point 74, battery 72, buzzer 70, conductor 68, switch $S_5$, conductor 46, contact point 46*b*, armature 32*b* and ground point 44.

As the code wheel revolves, however, the metallic tooth is replaced between the contact levers by an insulation tooth. This effectively stops the current still flowing between ground points 38 and 104 and deenergizes relays 14 and 32. Armature 14*b* then falls over against contact point 46*a* and completes a pen-magnet circuit comprising ground point 56, battery 54, relay windings 52*a*, switch $S_3$, contact point 48*a*, conductor 48, conductor 46, contact point 46*a*, armature 14*b* and ground point 42. The pen-magnet relay is energized causing the pen to make a mark on the moving tape. The length of the mark is determined by the time during which the insulation tooth is between the contact levers 20 and 22, for when its place is taken by the second metallic tooth current again appears in relay windings 14*a* drawing the armature back to its original position. Thus the number of insulation teeth determine the number of dashes on the moving tape for each code wheel revolution. The purpose of the metallic teeth other than to sound buzzer 70 will appear presently. Buzzer 70 continues to sound as long as any teeth, insulation or metallic, are between the levers 20 and 22, because relay 32 is then deenergized.

Figure 2:
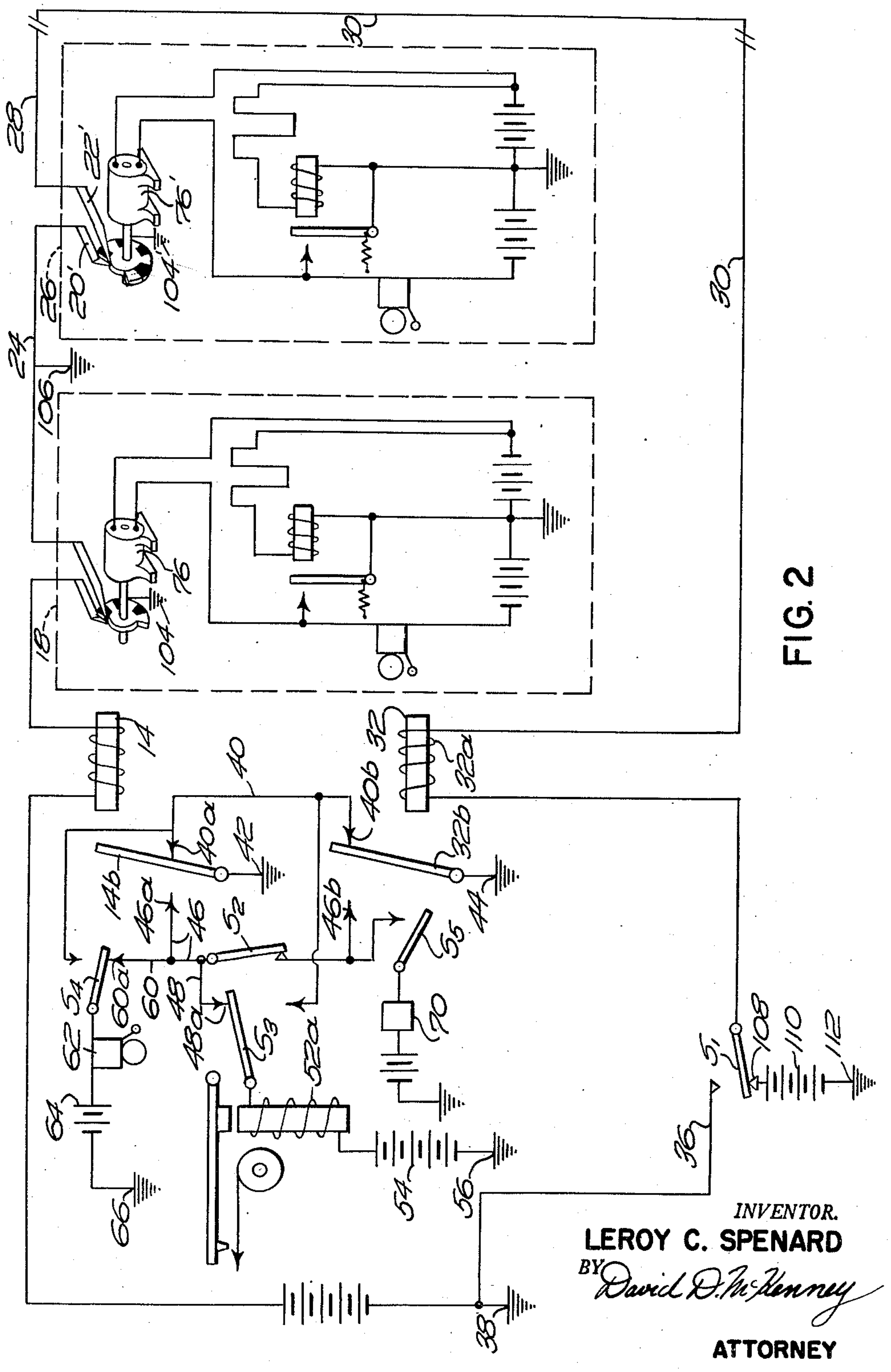
Figure 2 is another diagram of the circuit of Fig. 1, showing its condition after circuit changes have been made in the central office to permit continued operation despite an accidental ground fault.

The system shown in the drawings will work when there is a ground fault. Thus referring to Fig. 2, suppose conductor 24 becomes inadvertently grounded at 106 when the system has been in its normal standby condition of Fig. 1. This grounding by-passed that portion of the loop between the accidental ground 106 and ground point 38 deenergizing relay 32 and causing the buzzer 70 to sound as before. Upon hearing this and seeing there are no dashes appearing on the moving tape the central office operator knows there is a fault somewhere on the loop. He immediately throws switch $S_1$ over from conductor 36 to a contact point 108 connected to one side of a battery 110 the other side of which is grounded at ground point 112. This completes a circuit comprising ground point 112, battery 110, contact point 108, switch $S_1$, conductor 34, relay windings 32*a*, conductor 30 and so on, back to the accidental ground 106. Relay 32 is again energized and its armature 32*b* pulled back against contact point 40*b*.

In addition the central office operator closes switch $S_2$ and opens switch $S_5$. Assume now that premises 18 are broken into starting the motor 76. The first metallic tooth slides between contact levers 20 and 22 grounding the circuit at ground point 104. This, however, does not change the circuit because it is already grounded at ground fault 106, but when the insulation tooth slides between the contact levers the circuit from ground point 38 through relay 14 to ground fault 106 is opened and relay 14 deenergized. Consequently, armature 14*b* falls over against contact point 46*a* causing a dash to be made on the moving tape and causing bell 62 to ring. Similarly if premises 26 are broken into and motor 76' started a metallic tooth on its code wheel slides between contact levers 20' and 22' grounding the circuit fed by battery 110 at ground point 104'. But the grounding has no effect on this circuit because it is grounded anyway at ground fault 106. When each insulation tooth slides between the contact levers, however, the circuit from ground point 112 through relay 32 to ground fault 106 is opened deenergizing relay 32. As a result armature 32*b* falls over against contact point 46*b* energizing the pen-magnet relay and producing a dash on the moving tape because a circuit is completed comprising ground point 56, battery 54, pen-magnet relay windings 52*a*, switch $S_3$, contact point 48*a*, conductor 48, conductor 46, including closed switch $S_2$, contact point 46*b*, armature 32*b* and ground point 44. Likewise, the deenergizing of relay 32 causes bell 62 to ring because a circuit is completed comprising ground point 66, battery 64, bell 62, switch $S_4$, contact point 60*a*, conductor 60, conductor 46, including switch $S_2$, contact point 46*b*, armature 32*b* and ground point 44. Since switch $S_5$ has been opened the buzzer 70 does not sound when there is a ground fault followed by an intrusion.

Figure 3:
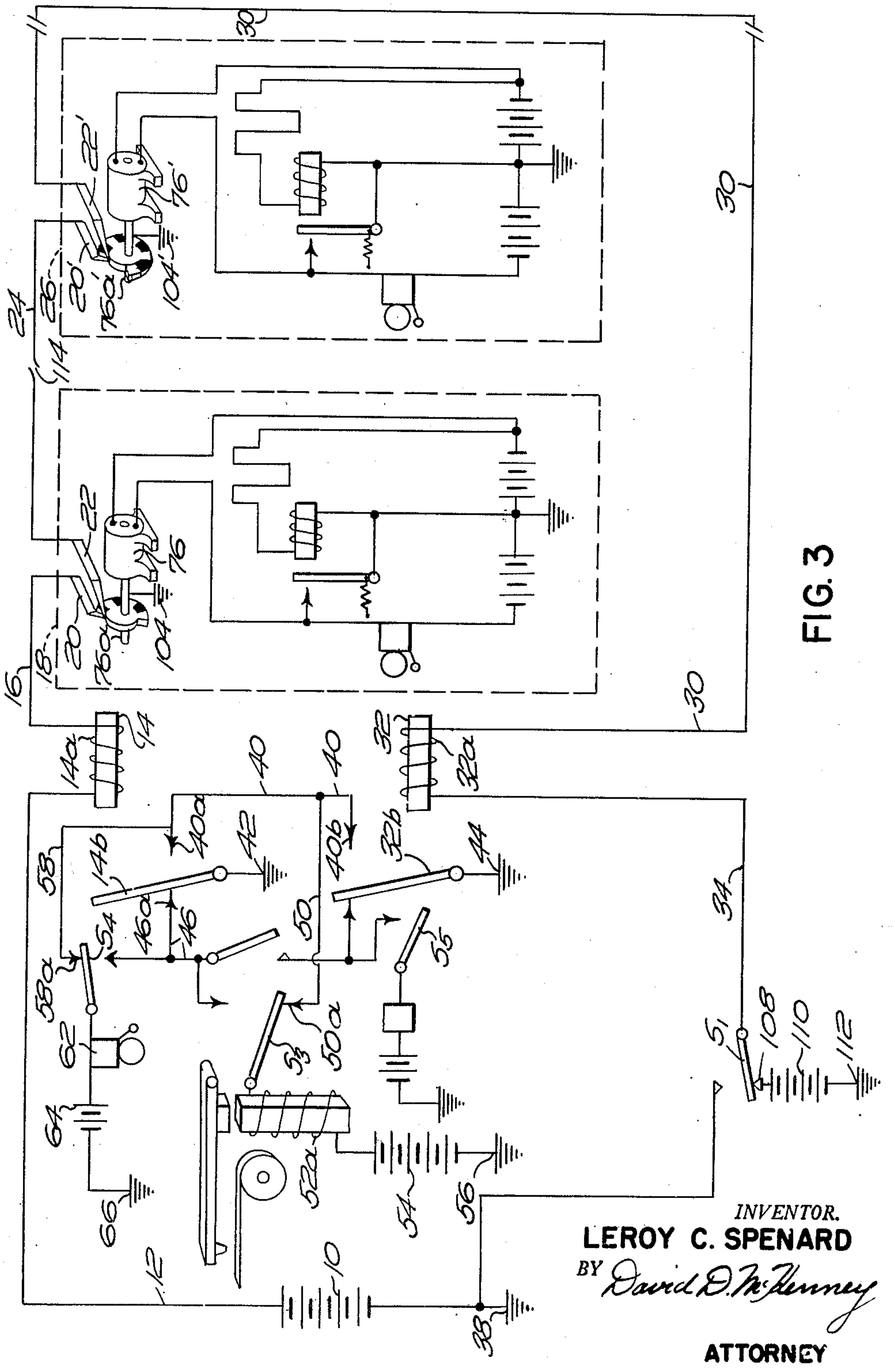
Figure 3 is still another diagram of the circuit of Fig. 1, showing its condition after circuit changes have been made in the central office to permit continued operation despite an accidental open fault.
Figures 4, 5:
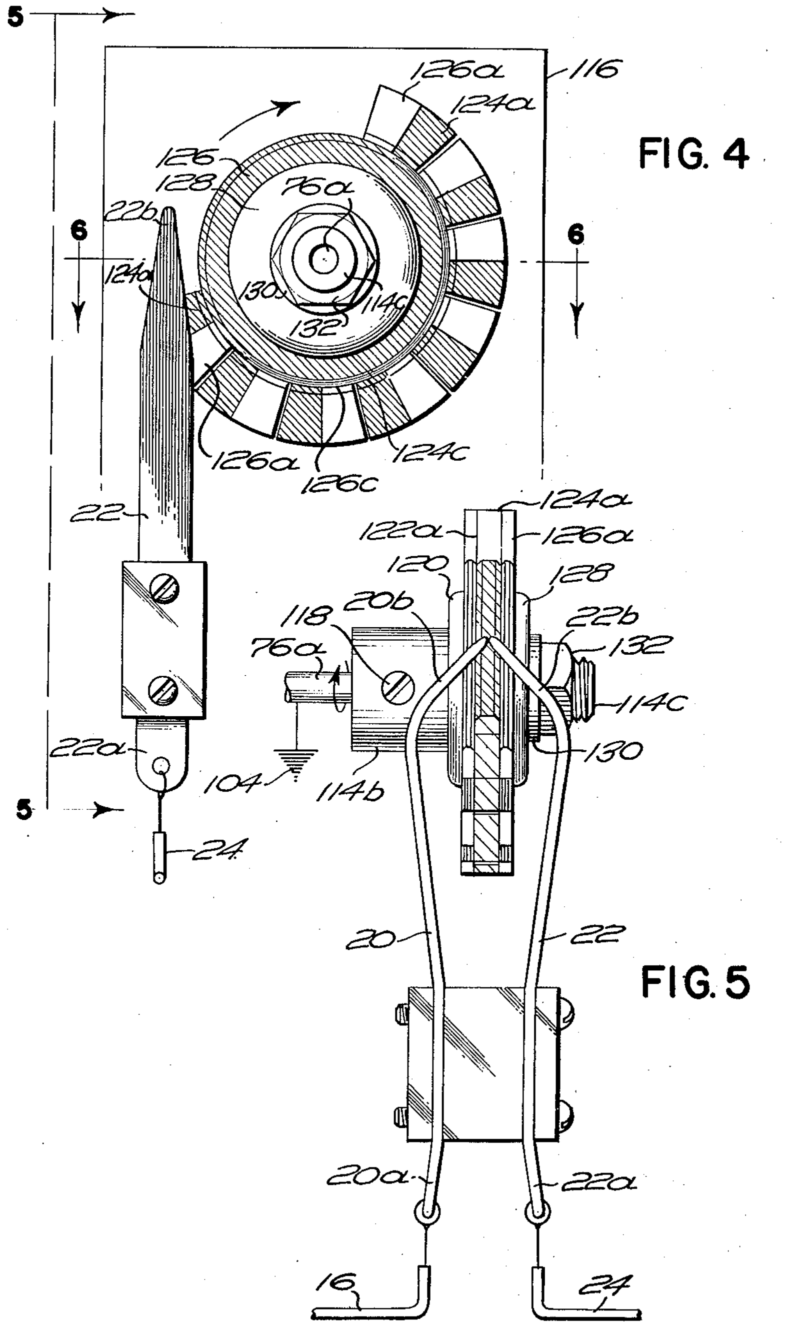
Figure 4 is a front elevation view of my improved code wheel and contact assembly.
Figure 5 is a side elevation view of the assembly taken as on line 5—5 of Figure 4.
Figure 6:
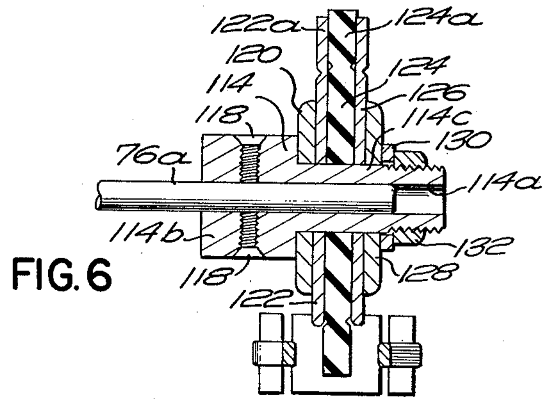
Figure 6 is a cross sectional plan view of the assembly taken as on line 6—6 of Figure 4.

The system will also work when there is an open fault in the loop. Thus referring to Fig. 3, suppose conductor 24 is accidently broken as at 114 when the system has been in its normal standby condition of Fig. 1. Current everywhere in the loop stops, deenergizing relays 14 and 32. Deenergizing relay 14 causes bell 62 to ring and produces a continuous dash on the moving tape. Deenergizing relay 32 causes the buzzer to sound. Upon noting these conditions a central office operator immediately throws switch $S_1$ over to contact point 108, throws switch $S_3$ over against contact point 50*a*, throws switch $S_4$ over against contact point 58*a* and opens switch $S_5$.

Assuming now an intrusion on premises 18, motor 76 begins to turn the code wheel whereupon a metallic tooth slides between contact levers 20 and 22 grounding the circuit at ground point 104 and thus completing a circuit comprising ground point 38, battery 10, conductor 12, relay windings 14*a*, conductor 16, contact lever 20, the metallic tooth on the code wheel, code wheel shaft 76*a* and ground point 104. Consequently, relay 14 is energized, drawing its armature 14*b* over against contact point 40*a* and thereby producing a dash on the moving tape by completing a circuit comprising ground point 56, battery 54, pen-magnet relay windings 52*a*, switch $S_3$, contact point 50*a*, conductor 50, conductor 40, contact point 40*a*, armature 14*b* and ground point 42. In addition bell 62 rings when relay 14 is energized because a circuit is completed comprising ground point 66, battery 64, bell 62, switch $S_4$, contact point 58*a*, conductor 58, conductor 40, contact point 40*a*, armature 14*b* and ground point 42.

When an insulation tooth takes the place of the metallic tooth current can no longer flow from ground point 38 through relay 14, to ground point 104, and relay 14 is deenergized. As a result armature 14*b* falls back against contact point 46*a* opening the pen-magnet and bell circuits.

Similarly if there is an intrusion on premises 26 on the other side of the open fault, the local circuit starts motor 76' which turns the code wheel associated with it, and a metallic tooth slides between contact levers 20' and 22'. This grounds the loop at ground point 104' and completes a circuit comprising ground point 112, central office battery 110, contact point 108, switch $S_1$, conductor 34, relay windings 32*a*, conductor 30, contact lever 22', the metallic tooth on the code wheel, shaft 76*a'* and ground point 104'. Consequently relay 32 is energized, drawing its armature 32*b* over against contact point 40*b* and thereby producing a dash on the moving tape because a circuit is completed comprising ground point 56, battery 54, relay windings 52*a*, switch $S_3$, contact point 50*a*, conductor 50, conductor 40, contact point 40*b*, armature 32*b* and ground point 44.

In addition bell 62 rings when armature 32*b* is drawn against contact point 40*b* because a circuit is completed comprising ground point 66, battery 64, bell 62, switch $S_4$, conductor 58, conductor 40, contact point 40*b*, armature 32*b* and ground point 44.

When an insulation tooth slides between contact levers 20' and 22' relay 32 is deenergized opening both the bell and pen-magnet circuits.

Having described the McCollough loop with which my invention may be used as shown, I turn now to a more detailed description of my code wheel and contact assembly. Referring to Figs. 4 through 8 the code wheel has a metallic cylindrical wheel hub 114 provided with an axial passage 114*a* suitable for receiving the end of a metallic shaft 76*a* rotatable by a motor 76 (not shown in these figures) located in housing 116. The cylindrical wheel hub 114 is secured to shaft 76*a* and prevented from rotating with respect thereto by two set screws 118 located in one of its ends 114*b*. The other end of the cylindrical wheel hub is reduced in diameter to form a shaft 114*c* as shown, on which there are nicely fitted in the following order, a washer 120, preferably metallic, a metallic disc 122 having spaced radial teeth 122*a* on a portion of its periphery, a second disc 124 of insulation material having substantially the same diameter as disc 122 and also having teeth 124*a* on a portion of its periphery, a third disc 126 identical to disc 122, a second washer 128 identical to washer 120 and a third washer 130. All of these parts are held firmly together and prevented from rotating with respect to each other and shaft 114*c* by a nut 132 threaded onto the end of this shaft until washer 120 is pressed tightly against the larger end 114*b* of the cylindrical wheel hub.

Figure 7:
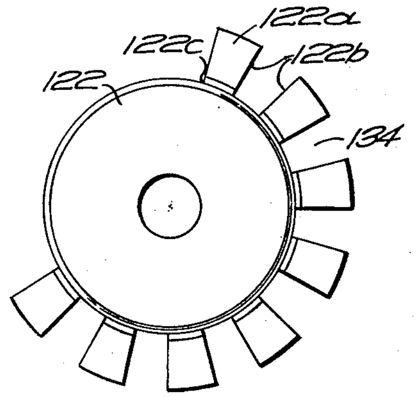
Figure 7 is an elevation view of one of toothed metal discs.
Figure 8:
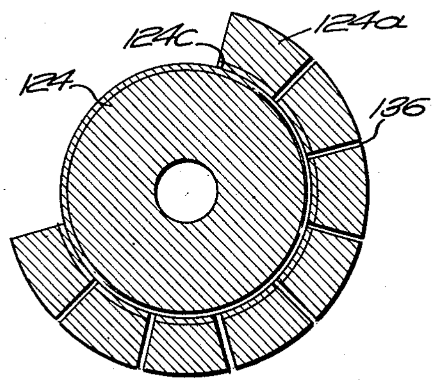
Figure 8 is an elevation view of the toothed insulation disc.

The radial teeth 122*a* on disc 122 are all the same size and are shown in Fig. 7 to be separated from each other about the periphery of the disc by angular spaces 134 substantially equal to the angular tooth width. Similarly the radial teeth 124*a* on the insulation disc 124 are all the same size but have an angular width twice that of teeth 122*a* and are separated from each other only by narrow radial cuts 136. See Fig. 8. Disc 124, however, has the same number of teeth as discs 122 and 126.

When the code wheel is assembled the several discs are aligned so that there is a metal tooth on either side of each insulation tooth 124*a* and, more particularly, so that the radial cuts 136 between the insulation teeth 124*a* are adjacent one of the radial edges 122*b* of each tooth 122*a* and the corresponding radial edge 126*b* of each tooth 126*a* on disc 126. In other words, each metal tooth 122*a* on disc 122 covers one-half of the side of an insulation tooth 124*a*, and likewise each metal tooth 126*a* on disc 126 covers the corresponding half of the other side of an insulation tooth.

When my improved code wheel and contact assembly is employed in an alarm system of the kind earlier described, one side of the circuit loop to the central office (conductor 16) is connected to the fixed lower end 20*a* of a spring contact lever 20, and the other side of the loop (conductor 24) is similarly connected to the fixed lower end 22*a* of a companion spring contact lever 22. These spring contact levers are arranged so that their upper ends 20*b* and 22*b* are located on opposite sides of the code wheel teeth toward which they are bent slightly so that on that portion of the code wheel periphery where there are no teeth these upper ends press against each other and complete the central office loop. When the code wheel rotates, however, (clockwise in Fig. 4) the teeth thereon sweep between the upper ends of the spring contact levers and move them apart. For example, the drawings show that the spring contact levers are first engaged and separated by an insulation tooth 124*a* on the center disc 124. This results in a new circuit condition. The central office loop is open. As the code wheel continues to revolve the metal teeth 122*a* and 126*a* on the outer discs 122 and 126, respectively, simultaneously engage the spring contact lever ends. An electrical current path is established through the metal parts of the code wheel to the metal shaft 76*a*. As described this current path is utilized to ground the loop at ground point 104. Continued rotation of the code wheel causes the loop to be alternately grounded and opened.

Since the exposed portion of each insulation tooth 124*a* has the same angular width as the metallic teeth 122*a* and 126*a* on either side thereof and the code wheel revolves at a constant rate, the duration of each open loop and grounded loop interval is the same. In addition, the loop is open and grounded the same number of times. Thus the central office equipment, which can be made responsive to either an open or grounded loop, gives the same code signal when there is an unrepaired loop defect as when the loop is in its normal operating condition.

It is a feature of my invention that there are no parts which need to be accurately adjusted. The angular width of the insulation or metal teeth determines the signal duration. Since these teeth are non-adjustable and the spring contact levers bearing on them are non-critical in adjustment, the signals and the intervals between them as received in the central office will always be the same and unaffected by the tinkering of inexpert repairmen.

It is another feature of my improved assembly that the teeth 122*a*, 124*a* and 126*a* are all scored at 122*c*, 124*c* and 126*c* where they join their respective discs so that the number of teeth may be decreased quickly and easily by breaking some of them off. Thus, if a code wheel originally has nine tooth groups, that is, nine insulating teeth each having a metal tooth on either side thereof, one revolution of the code wheel will open the circuit loop nine times and ground it nine times, and if it is desired to establish a new code for the premises, this may be done by breaking off all the teeth of one or more tooth groups. If, for example, one insulation tooth and its adjacent metal teeth were broken off the code wheel above referred to, one revolution would thereafter open the loop eight times rather than nine times and likewise ground it eight times.

Though I prefer to use three teeth carrying discs as hereinbefore described, it will be understood to be within the broad scope of my invention to achieve disconnections of the contact levers alternating with simultaneous connections thereof to the shaft by other arrangements. For example, the extending portion of the insulating disc need not be divided into closely spaced teeth but may be continuous with spaced conducting members embedded therein so as to appear on opposite sides thereof for engagement with the contacts. Electrical connection of these conducting members to the shaft would then permit the same operation as my preferred device.

I claim:

1. In a circuit a circuit maker and breaker comprising a pair of spring contacts which normally bear against each other and are thereby electrically connected so as to close portions of said circuit, a shaft formed of conducting material, rotatable about its axis and connected to ground, a circular disc formed of insulating material and mounted on the shaft for rotation therewith, a plurality of uniform closely spaced teeth formed of insulating material and extending radially from a portion of the periphery of the disc, two identical circular discs formed of conducting material and secured to opposite sides of the insulation disc for rotation therewith, each said conducting disc having substantially the same diameter as the insulating disc and having teeth formed of conducting material extending radially from a portion of the periphery thereof corresponding with said portion of the periphery of the circular disc, each conducting tooth on one of the conducing discs covering a portion of the surface of one side of an insulating tooth, and each conducting tooth on the other conducting disc covering a corresponding portion of the surface of the opposite side of an insulating tooth, said covered and uncovered portions of the insulating teeth being adapted to enter between and separate the contacts upon rotation of the shaft, and said conducting discs being mounted for rotation with and electrically connected to the shaft and thus to ground, whereby as the shaft rotates the entrance of the uncovered portions of the insulating teeth between the contacts electrically disconnects the latter and opens said portions of the circuit and the entrance of the covered portions of the insulating teeth electrically connects the contacts to each other and to the shaft and ground, and when none of the covered or uncovered portions is between the contacts, said contacts engage each other so as to close said portions of the circuit.

2. A circuit maker and breaker as defined in claim 1 in which each insulating and conducting tooth is deeply scored where it joins its respective circular disc so as to provide a frangible joint, whereby the number of times the contacts are electrically disconnected and connected to the shaft for each revolution of the shaft may be readily reduced by merely breaking off one or more insulating teeth and the conducting teeth covering the portions of the sides thereof.

3. In a circuit maker and breaker a substantially circular disc formed of insulating material and mounted on a shaft for rotation therewith, a plurality of substantially uniform closely spaced teeth formed of insulating material and extending radially from at least a portion of the periphery of the disc, two substantially circular discs formed of conducting material and secured to opposite sides of the insulation disc, each of said conducting discs having substantially the same diameter as the insulating disc and having teeth formed of conducting material extending radially from at least a portion of their peripheries corresponding with said portion of the periphery of the insulating disc, each conducting tooth on one of the conducting discs covering at least a portion of the surface of one side of an insulating tooth, and each conducting tooth on the other conducting disc covering a substantially corresponding portion of the surface of the opposite side of an insulating tooth, at least certain of said insulating and conducting teeth being deeply scored where each joins its respective circular disc so as to provide a frangible joint whereby selected of the insulating and conducting teeth can be broken off from their respective discs.

4. In a circuit maker and breaker a substantially circular disc formed of insulating material and mounted on a shaft for rotation therewith, a plurality of substantially uniform closely spaced teeth formed of insulating material and extending radially from at least a portion of the periphery of the disc, two substantially circular discs formed of conducting material and secured to opposite sides of the insulation disc, each of said conducting discs having substantially the same diameter as the insulating disc and having teeth formed of conducting material extending radially from at least a portion of their peripheries corresponding with said portion of the periphery of the insulating disc, each conducting tooth on one of the conducting discs covering at least a portion of the surface of one side of an insulating tooth, and each conducting tooth on the other conducting disc covering a substantially corresponding portion of the surface of the opposite side of an insulating tooth, each of said insulating and conducting teeth being deeply scored where it joins its respective circular disc so as to provide a frangible joint whereby selected of the insulating and conducting teeth can be broken off from their respective discs.

References Cited in the file of this patent

UNITED STATES PATENTS

| | | |
|---|---|---|
| 825,632 | Black | July 10, 1906 |
| 1,127,808 | Reynolds et al. | Feb. 9, 1915 |
| 1,187,315 | Henry | June 13, 1916 |
| 2,236,299 | Reid | Mar. 25, 1941 |
| 2,254,347 | Blakesley | Sept. 2, 1941 |